United States Patent [19]
Codrino

[11] 3,784,770
[45] Jan. 8, 1974

[54] CONTROL UNIT FOR LIGHTS, DIRECTION INDICATORS, AND WINDSHIELD-WIPER

[76] Inventor: Giuseppe Codrino, Viale Stazione, Quattordio, Italy

[22] Filed: June 20, 1972

[21] Appl. No.: 264,542

[52] U.S. Cl. .......................................... 200/61.36
[51] Int. Cl. ................................................ H01h 3/18
[58] Field of Search ...................... 200/61.27, 61.28, 200/61.3, 61.31, 61.32, 61.33, 61.34, 61.35, 61.36, 61.37, 61.38; 340/74, 76

[56] References Cited
UNITED STATES PATENTS
2,917,725  12/1959  Pearl ............................. 200/61.33 X
2,516,561   7/1950  Galey et al. .................... 200/61.36 X Primary Examiner—Robert K. Schaefer
Assistant Examiner—William J. Smith
Attorney—Michael S. Striker

[57] ABSTRACT

An improved control unit for lights-direction indicator-windshield wiper for a motor car wherein the direction indicator is constructed to maintain, after acutation of the indicator, the respective indicator light turned on to indicate the turn the car will make, even if the steering wheel should be turned slightly in opposite direction, until the wheels of the car are moved back to the normal driving position.

8 Claims, 5 Drawing Figures

CONTROL UNIT FOR LIGHTS, DIRECTION INDICATORS, AND WINDSHIELD-WIPER

This invention relates to an improved control unit for lights-direction indicators-windshield wiper, provided with a particular device, adapted to ensure the counter-actuation of the steering wheel without cutting off the direction change indicating circuit.

As well known, on all motor vehicles there are intalled intermittent flashers to warn any change in the travel direction.

Said direction indicators are generally controlled by a shuntswitch, contained in a special box-shaped body of an approximately cylindrical configuration together with other switches, relating to the motor vehicle's external lighting circuits and possibly the performance of the windshield wiper. The aforementioned shunt-switch is provided further with a lever, easing the displacement onto either of the contacts so as to switch on the R. H. or L. H. flashers of the motor vehicle. The indicating device of a direction change is shaped so that upon return of the steering wheel to the ordinary travel position, after the turning or the temporary deviation of the motor vehicle, the aforesaid control lever of the device itself returns to its rest position, leaving the feed circuits of both R.H. and L.H. flashers open.

This occurs, however, even in the case of a partial counter-actuation on the steering wheel, for example when the travel is "widened" in order to better take a turn.

In the case of traditional devices, by even holding the shunt-switch control lever, the some returns to its rest position, as soon as it is released and it should be displaced again in order to actuate the direction flashers.

The improved control unit according to the present invention permits to carry out any counter-actuation without thereby causing the disconnection of the aforementioned lever and consequently cutting off the indicating circuits.

These and further characteristic features of a functional and constructional nature of said improved control unit will be better understood from perusal of the figures on the accompanying drawings, in which.

Figure 1:
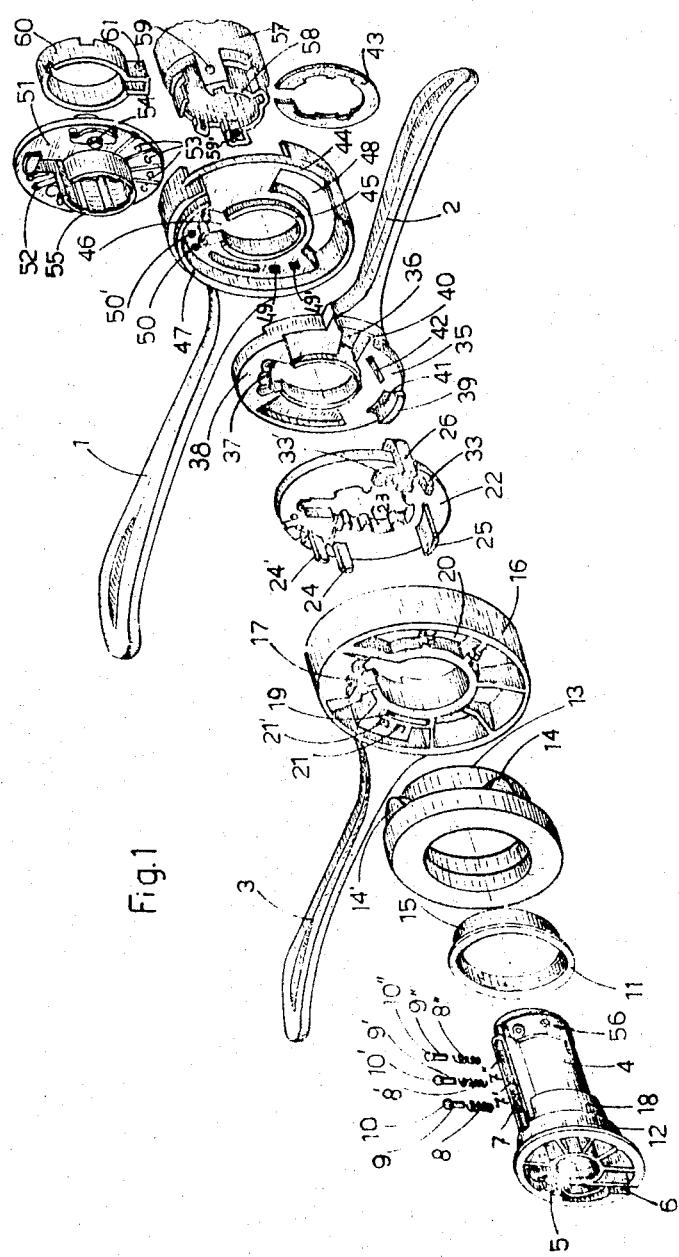
FIG. 1 shows an exploded perspective view of the control unit for a light-direction indicators-windshield wiper.

Referring now particularly to the numeral symbols of the various figures on the accompanying drawings, the improved control unit according to the present invention shows three control levers, i.e.: lever 1 for switching on the lights and the flashing; lever 2 for actuating the two-speed windshield wiper; lever 3 for the direction indicator control.

The improved control unit in accordance with the present invention consists of a boat-shaped body 4 of variable outer sections, provided on the front side with a contact strip 5, inserted in a cavity and a hole 6 for the passage of related electrical connection wire, controlling the horn. In the motor cars, provided with shock-proof column which by distortion in case of accidents protects the driver, said horn does not perform, since the shock-proof column is fitted with a hinge, consisting of plastic material and therefore it is electrically insulated.

Figure 3:
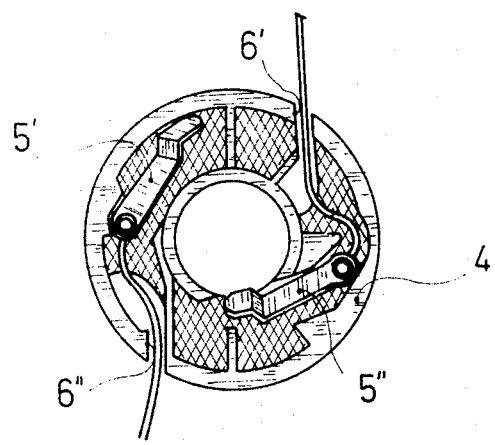
FIG. 3 represents a front perspective view of a particular horn with which the control unit according to this invention is fitted.

In said motor cars, the boat-shaped body 4 (see FIG. 3) is provided in the front cavity with two strips 5' and 5'' and two holes 6' and 6'', through which related cables pass one of which is placed on the ground.

In this manner, by actuating the push-button placed onto the steering wheel, both strips are brought into contact, thereby ensuring the closing of the horn control circuit.

The boat-shaped body 4 shows further on its outer surface three cylindrical bores 7, 7' and 7'', arranged longitudinally, in which there are seated three springs 8, 8' and 8'', respectively, and the stems 9, 9' and 9'' of three small-sized balls 10, 10' and 10''.

The body 4 is inserted into the cylindrical sealing member 11, which has an inner diameter corresponding to the outer diameter of the part 12 of the body 4 itself, and the collar 13, showing two obtuse dihedral-shaped projections 14 and 14' having an inner diameter equal to the outer diameter of the part 15 of the aforesaid sealing member 11.

The thickness of the collar 13 is such that by pushing the annular body 16 onto the boat-shaped body 4 the part 17 of the annular body 16 is in contact with the ball 10.

Obviously, the inner diameter of said body 16 is corresponding to the outer diameter of the part 18 of the boat-shaped body and shows at the aforementioned part 17 a discontinuity with a view to ensuring a suitable rotation of the body itself about the seat of the ball 10.

Said part 17 shows further a series of inclined grooves with which the ball 10 may engage, thereby holding the aforementioned annular body at a determined position. Said body 16 may easily rotate about the boat-shaped body 4, overcoming the pressure of the spring 8, applied to the ball 10 by acting on the lever 3, integral with the body itself.

Oviously, the rotation will be limited to the portion 17 in which there are provided the aforesaid inclined grooves. In the annular body 16 there are further provided two holes (one of which 19 is visible in FIG. 1), an opening 20 with edges in relief, and a spring-suspended contact strip, not visible in the figure, arranged on the rear side and engaging in the through-holes 21 and 21'.

To the body 16 is connected a plate 22, provided with a rear collar 23, and three projections 24, 24' and 25 orthogonal to its surface inserted through the aforementioned holes.

Figure 4:
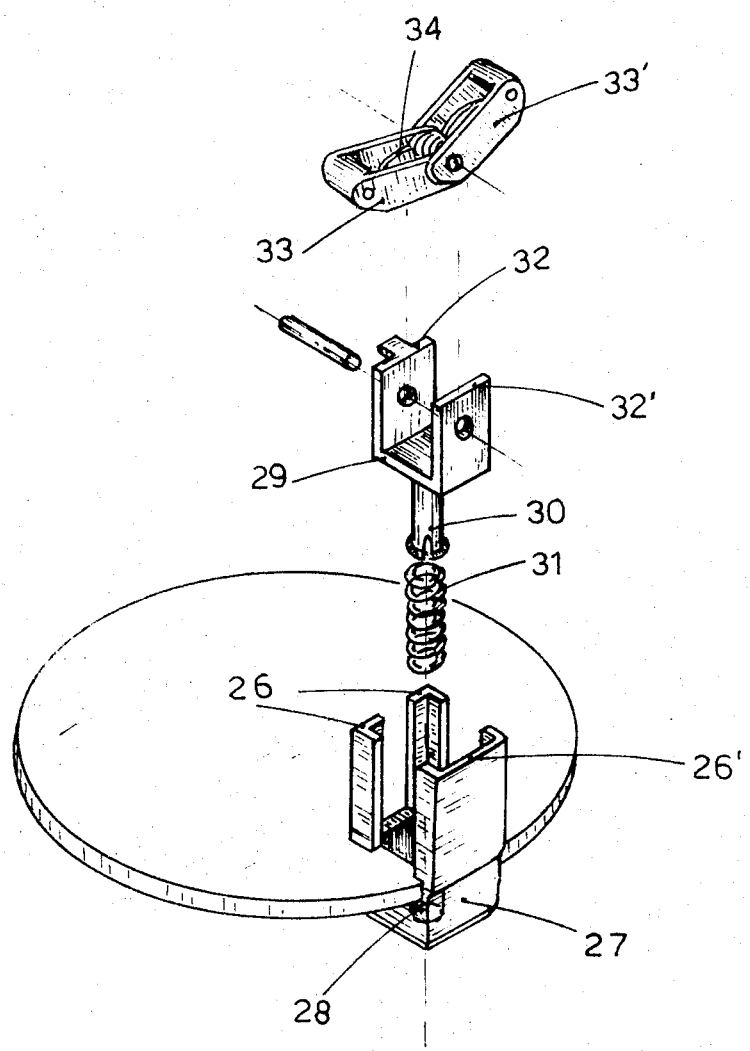
FIG. 4 shows an exploded perspective view of the particular device ensuring the execution of a counter-actuation on the steering wheel, without cutting off the direction indicator circuit.

With said plate 22 there is integral an approximately U-shaped member with the side rods 26 and 26' being suitably moulded and with the base 27 of adequate thickness, in which there is drilled a central through-hole 28 (FIG. 4).

The aforementioned moulded rods 26 and 26' and the through-hole 28 serve as a guide means for a fork-shape member 29, fitted with a stem 30 to which there is applied a spring 31. Said stem 30 is inserted into the through-hole 28 and is retained on the lower part thereof through an enlargement arranged at its end or through another suitable arrangement.

To the upper wings 32 and 32' of the member 29, which may slide between the rods 26 and 26' there are journalled via a pin two ribs or toggle herein 33 and 33', which are kept wide apart by a small antagonistic spring 34.

The aforementioned ribs may insert themselves partially through a rotation about the pin, on which they are journalled into each other as being internally hollow.

Said ribs show further their opposite ends suitably bent. The rods 26 and 26' of the U-shaped member, inside which there is placed the fork-shaped member 29, provided with such ribs, are inserted into the hole 20, provided in the annular body 16.

Obviously, under normal conditions, the ribs 33 and 33' will place themselves with their ends wide apart, without preventing the rotation of the collar 13, integral with the steering wheel.

By acting on the lever 3 and displacing it, for example downwardly, the ball 10 will move into the right-hand cavity, provided in the portion 17 of the body 16, and the contact trip, placed on the body itself, will close the circuit of the direction indicators, situated on the left side of the motor vehicle.

Simultaneously, the lower edge of the opening 20 will move a certain section upwardly, pressing on the rib 33 until placing it in an orthogonal direction relative to the surface of the collar 13.

Under these conditions, the projection 14 and 14' of the aforementioned collar 13 will engage, in case of rotation of the steering wheel, the end of the rib 33'.

By turning the steering wheel to the left side, namely according to the warn indication direction change, the projections 14 and 14' will encounter no resistance of the rib 33, which will partially insert itself into the rib 33' upon the passage of the aforesaid projections and then will reach again a contrast position relative thereto under the action of a spring 34. By turning the steering wheel in an opposite direction, the first of the two projections 14 and 14' meeting with the end of the rib 33 will be pressing against it and its thrust will be transmitted into the lower edge of the opening 20. The annular body 16 will then be compelled to rotate in the same direction until both ribs are again fully wide apart. The stop-ball 10 will trip into the median groove, provided in the portion 17, the lever 3 will return to its rest position, and the contact strip will rotate so as to cut off the operating circuit of the direction indicating lamps. Obviously, once a direction change has been indication, should a sufficiently wide counter-actuation be carried out, as a result of which one of the reliefs 14 or 14' of the collar 13 engages with one of said ribs 33 or 33', the circuit of the direction indicator will be equally cut off. By the particular support device of the aforesaid ribs, with which the improved control unit according to the present invention is equipped, it is instead possible to carry out a counteractuation after indicating the direction change, keeping the indicators themselves in operation, provided the lever 3 is kept in the formerly chosen position, during the execution of said counter-actuation.

In such event, in fact, the rib 33 or 33', engaged by one of the projections 14 or 14' and contrasted, on one of its sides, by the edge of the opening 20, will overcome the resistance opposed by the spring 31 and move with the fork-shaped member 29 axially to the U-shaped member as necessary for the passage of the projections; the rib returns to its original position soon after under the action of the spring 31.

Said operation is eased besides by the obtuse dihedral-shaped configuration of the aforesaid projections also by the particular shape of the ends of the ribs 33 and 33'.

Into the collar 23 of the strip 22 inserts itself the annular body 35, provided with the lever 2 for the actuation of the circuits of the two-speed windshield wiper and windshield washer.

In said annular body there are provided: the cavity 36 in which there is housed the base 27 of the aforementioned U-shaped member and three inclined grooves 37, engaging with the stop-ball 10'.

The width of said cavity 36 is obviously proportional to the width of the rotary displacement which said annular body 35 itself is subjected to for the closing of the circuits actuating the windshield wiper and windshield washer.

The aforementioned annular body 35 shows further three reliefs 38, 39 and 40 over which the plate 22 slides the thickness of which is such as to bring the grooves 37 into contact with the stop-ball 10'.

Behind said annular body 35 there are provided on a raised portion two spring-suspended contact strips, placed at the two holes 41 and 42 for the closing of said windshield wiper actuating circuits.

On the boat-shaped body 4 there is applied the stop-segment 43 having a suitably shaped inner profile in order to ensure the passage of the wirings of the various circuits.

On the same boat-shaped body 4 there is applied the annular body 44, provided with the lever 1 for switching the lights and flashing.

Said body 44 has a laminar structure with the inner edge 45 being slightly enlarged and showing a discontinuity 46 in which there are provided inclined grooves for receiving the ball 10''.

The above-mentioned annular body also shows a wide outer edge 47 with a double profile extending over slightly more than the half of its periphery.

Figure 2:
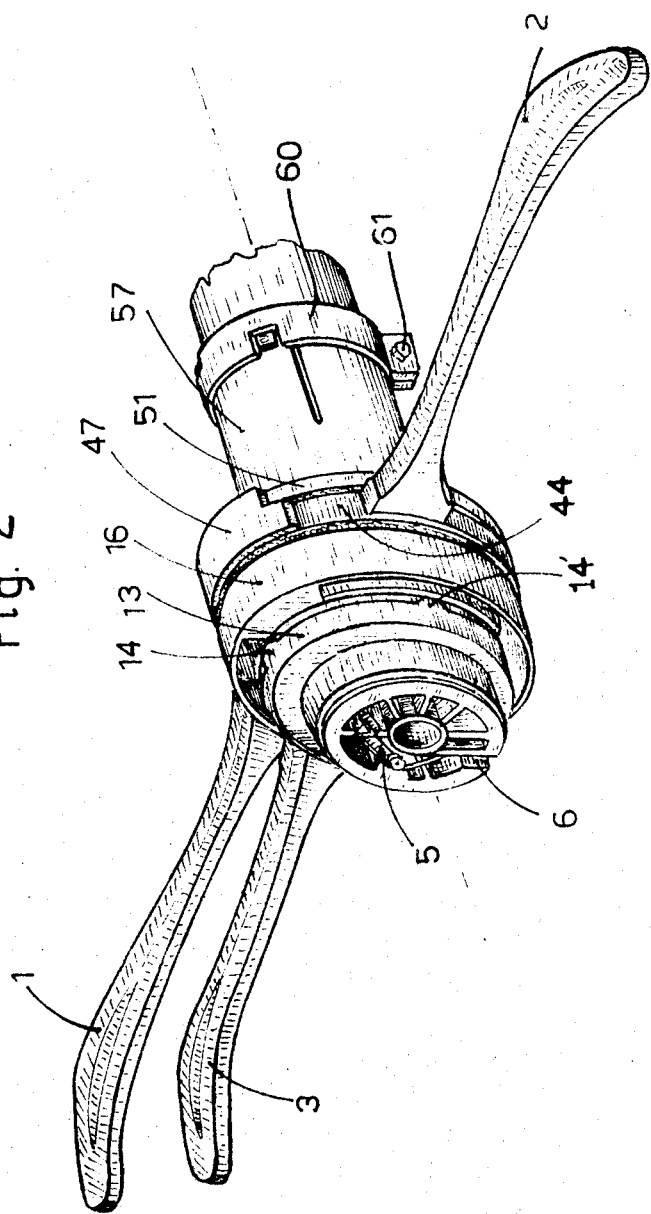
FIG. 2 shows a perspective view of the same control unit as above.

Such a shape enables said edge 47 to fully surmount the annular body 35 and to rest upon the surface of the body 16 (as shown in FIG. 2).

In the body 44 there is provided the opening 48, through which may outgo the two contact strips in relief, placed at the rear of the annular body 35.

Two spring-suspended contact strips are fitted behind said body 44 at the through-holes 49, 49' and 50, 50'.

Finally on the boat-shaped body 4 there is placed the circular base 51 serving as support for the thimbles: (a) of the circuits of the high beam and low beam lights 52; (b) of the two-speed windwhield wiper; (c) of the push-button switch 54 of the dashing.

The aforesaid base 51 is provided with a collar 55, showing an upper opening of a width corresponding to that of the seat for the balls 10, 10' and 10''.

Said collar 55 has an outer diameter, corresponding to the inner diameter of the edge 45 of the annular body 44 inside which it is inserted. At the end of the boat-shaped body 4 there is placed a band 56 serving to tighten the so obtained assembly, said band being suitably fastened by means of rivets to the boat-shaped body.

On the same end of the boat-shaped body 4 is inserted the hollow body 57 the edge of which 58 is suitably shaped and shows two through-holes 59 and 59' for its fixed connection to the aforementioned boat-shaped body 4.

On said hollow body there is further fitted the band 60, provided with a bolt 61 for fastening the so obtained unit.

In the improved control unit according to the present invention, the various indicating circuits such as the position lights, the dazzling and antidazzling lights, windshield wiper, windshield washer, etc. are controlled by a series of shunt-switches.

Said shunt-switches are generally of the movable contact type, sliding over pairs of fixed contacts, mounted respectively on parts which may rotate and fixed parts.

Said movable contact consists of a metal staple of sufficient dimensions to bring two adjacent fixed contacts into contact with each other, thereby actuating the necessary switching of the circuits.

The metal staple referred to above is accommodated in the movable annular portion or rotor of the instant control unit and is urged against the fixed contacts by a coil spring.

Figure 5:
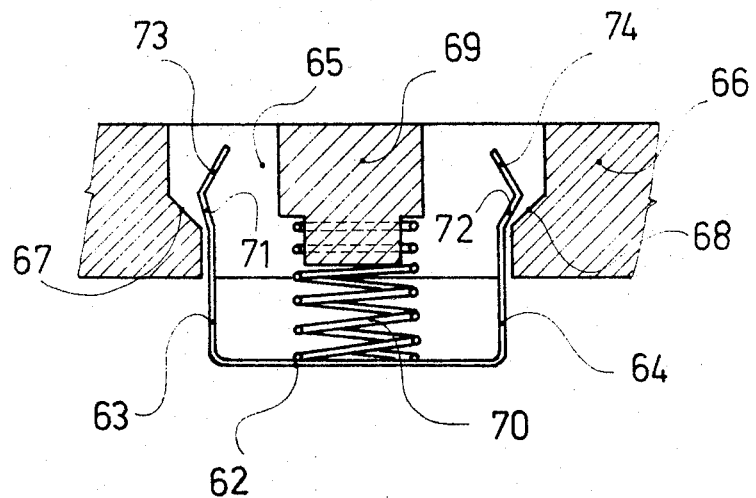
FIG. 5 represents a vertical section through a movable contact, applicable to the various control unit circuits as shown in the preceding figures.

The aforesaid metal staple may be of any type or shape whatever, even if in practice the staple type as shown in FIG. 5 is preferred.

As may be seen from the above figure, the metal staple consists of a metal strip, showing: a flat lower part 62 of sufficient width to bring the two fixed contacts into contact with each other, and two side parts 63 and 64 folded over upwardly, constituting guide means for the movable contact in the seat 65, provided in the body of the rotor 66.

Said seat 65 shows along its side walls two steps 67 and 68 for retaining the movable contact and in central position a gudgeon pin 69 for anchoring the counter spring 70. The free ends of the two parts 63 and 64 show a section 71 and 72, respectively, folded over in a diverging manner and a section 73 and 74, respectively, folded over in a converging manner.

In the shunt-switch made up as above, the movable contact may be easily inserted into the seat 65 by a simple pressure. Furthermore, the converging parts 73 and 74 promote the sliding of the two parts 63 and 64 inside the seat 65, whilst the two diverging sections 71 and 72 being contrasted by the steps 67 and 68 maintain the movable contact in locked condition.

From the foregoing specification and perusal of the various figures on the accompanying drawings, one may easily see the greater functionality and practical application, characterizing the improved control unit according to the present invention.

Obviously, the instant control unit for lights-direction indicators and windscreen wiper has been formerly described and illustrated by way of non-limiting example and to demonstrate the practical embodiment and general characteristic features of the present invention.

Various changes and modifications could be introduced in the practical embodiment of the instant improved control unit, without departing from the scope of the present invention as defined in the appended patent claims.

What we claim is:

1. In a direction indicator for an automotive vehicle, a combination comprising a support; a collar adapted to be connected to the steering wheel of the automotive vehicle for turning therewith, said collar being turnably mounted on said support and having on its outer surface a pair of circumferentially spaced projections; an annular member turnably mounted on said support from a neutral position to a pair of active positions on either side of said neutral position and provided with contact means for closing in said active positions a right hand or a left hand indicating circuit, said annular member being formed with an opening therethrough defined in part by substantially radially extending walls; cooperating means on said support and said annular member for releasably holding the latter in any of said positions; a lever projecting from said annular member for turning the same between said positions; a pair of toggle levers in said opening pivotally connected at adjacent ends about pivot means for tilting between a first position in which said levers are inclined with respect to each other slightly less than 180° to engage with outer ends thereof said pair of walls, respectively, and a second position in which one of said levers extends substantially normal to the other of said levers and in which the outer end of said one lever projects out of said opening in the path of the projections of said collar; biasing means cooperating with said levers for yieldably maintaining the same in said first position; and means mounting said pivot means in a predetermined position in said opening and yieldably in axial direction of said annular member away from said collar, said toggle levers being in said first position when said annular member is in said neutral position and a respective one of said levers being moved to said second position by engagement of its outer end with a respective one of said pair of walls during turning of said annular member to one of its active positions.

2. A combination as defined in claim 1, wherein the outer ends of said levers are curved.

3. Improved control unit for lights-direction indicator and windshield wiper, including three control levers respectively for switching the lights and flashing, actuation of a two-speed windshield wiper and control of the direction indicators characterized in that said control unit is made up of the following parts:

a. a boat-shaped body 4 of variable outer section, and provided on the front side with a special cavity in which there is disposed the horn and provided with three bores (7), (7') and (7'') of cylindrical shape extending inwardly from the upper outer surface, in which there are three springs (8), (8') and (8'') and the stems (9), (9') and (9'') of three small balls (10), (10') and (10'');

b. a collar (13) having two projections (14) and (14') shaped like an optuse dihedral, which via the sealing member (11) is mounted on the inner portion (12) of the boat-shaped body (4);

c. an annular body (16) carrying the lever (3) mounted on the boat-shaped body (4) at the ball (10) and comprising: a part (17), grooved so as to rotate stepwise about the seat of the ball (10), two holes (19), an opening (20) with raised edges and a spring-suspended contact body, situated at the rear of the annual body and engaging in the through-holes (21) and (21');

d. a strip (22), provided with rear collar (23) has three extensions (24), (24') and (25), inserted into the holes (19) of the annular body (16), and integral with said strip, provision being made for a U-shaped member with two ribs (33) and (33') being wide apart, oscillating in a vertical and horizontal direction, which are inserted into the hole (20) of the annular body (16);

e. an annular body (35) with which is integral the lever (2), is mounted on the boat-shaped body (4) at the ball (10'), and extends into the collar (23), said annular body being provided with a cavity (36) in which is seated the base of the U-shaped member, three inclined grooves (37), adapted to be engaged by the ball (10'), three reliefs (38), (39) and (40) over which the strip (22) slides and on the rear side two contact strips, placed at the two holes (41) and (42);

f. a stop-segment (43) followed by an annular body (44), integral with the lever (1) and the inner edge (45) of which is slightly enlarged and shows a discontinuity (46) whereat there are provided three grooves for receiving the ball (10''), said annular body having a wide outer edge (47), developing over slightly more than half of its periphery, an opening (48) through which extend two contact strips and two contact strips placed at the rear of the body at the through-holes (49), (49') and (50), (50');

g. a circular base (51), supporting the thimbles, provided with a slotted collar to provide for the seat of the balls (10), (10') and (10''), inserted into the edge (45) of the annular body (44); and h. a band (56) for tightening the whole assembly.

4. Improved control unit as defined in claim 3, characterized in that the U-shaped member, integral with the strip (22) is made up of two side rods (26) and (26') and a base (27) in which there is provided a through-hole (28), arranged centrally, said side rods serving as guide means for a fork-shaped member (29), provided with a stem (30) on which there is fitted a spring (31), inserted into the hole (28) and two upper expansions (32) and (32'), which may slide between the rods (26) and (26'), two ribs (33) and (33') kept wide apart by an antagonistic spring (34), which may partially be inserted into each other by being journalled to the aforesaid expansions via a plug.

5. Improved control unit as defined in the claim 3, characterized in that at the end of the boat-shaped body (4) there is inserted a hollow body (57), being fastened via two through-holes (59) and (59') provided on its edge (58).

6. Improved control unit as defined in claim 3, characterized in that in the cavity provided on the boat-shaped body (4) there is disposed a contact strip (5).

7. Improved control unit as defined in claim 3, characterized in that when the motor car is provided with a shock-proof column in the cavity of the boat-shaped body (4) there are disposed two contact strips (5') and (5'') one of which is placed on the ground.

8. Improved control unit as defined in claim 3, characterized in that the shunt-switches controlling the various circuits are of the movable contact type and consist of a shaped metal strip, showing a flat part (62) of rectangular surface and sufficient width to bring the two fixed contacts into contact with each other, and two parts being folded over upwardly (63) and (64), serving as a guide means for the movable contact itself in the seat (65) of the rotor (66), the free ends of the two parts (63) and (64) showing a section folded over in a diverging manner (71) and (72), respectively, and a section folded over in a converging manner (73) and (74), respectively, the seat (65) being provided along its vertical walls with two steps (67) and (68) and in central position a gudgeon pin (69) for anchoring the antagonistic spring (70).

* * * * *